United States Patent [19]
Chao et al.
[11] Patent Number: 4,650,783
[45] Date of Patent: Mar. 17, 1987

[54] PHOSPHORUS MODIFIED ALUMINA MOLECULAR SIEVE AND METHOD OF MANUFACTURE

[75] Inventors: Tai-Hsiang Chao, Mt. Prospect; Michael T. Cleary, Elmhurst, both of Ill.

[73] Assignee: UOP Inc., Des Plaines, Ill.

[21] Appl. No.: 811,554

[22] Filed: Dec. 20, 1985

Related U.S. Application Data

[60] Continuation of Ser. No. 649,243, Sep. 10, 1984, abandoned, which is a division of Ser. No. 463,771, Feb. 4, 1983, Pat. No. 4,521,343.

[51] Int. Cl.$^4$ .......................... B01J 20/10; B01J 20/08
[52] U.S. Cl. .......................... 502/407; 502/214
[58] Field of Search .......................... 502/214, 407, 415

[56] References Cited

U.S. PATENT DOCUMENTS

| | | | |
|---|---|---|---|
| 3,463,744 | 8/1969 | Mitsche | 502/8 |
| 4,270,017 | 5/1981 | Young | 502/214 |
| 4,379,761 | 4/1983 | Olson et al. | 502/214 |
| 4,518,703 | 5/1985 | Young | 502/214 |

*Primary Examiner*—Carl F. Dees
*Attorney, Agent, or Firm*—Thomas K. McBride; John F. Spears, Jr.; Jack H. Hall

[57] ABSTRACT

This invention relates to a molecular sieve comprising silicalite in a phosphorus modified alumina matrix, the precursor of the molecular sieve comprising silicalite powder dispersed in an alumina hydrosol commingled with a phosphorus containing compound, the phosphorus to aluminum molar ratio in the molecular sieve being from 1:1 to 1:100.

7 Claims, 3 Drawing Figures

PHOSPHORUS MODIFIED ALUMINA MOLECULAR SIEVE AND METHOD OF MANUFACTURE

CROSS-REFERENCE TO RELATED APPLICATION

This application is a continuation of Ser. No. 649,243 filed Sept. 10, 1984 (now abandoned), which is a division of our applicaton Ser. No. 463,771, filed Feb. 4, 1983 now U.S. Pat No. 4,521,343.

BACKGROUND OF THE INVENTION

1. Field of the Invention

The field of art to which this invention pertains is molecular sieves. More specifically, the invention relates to phosphorus modified alumina molecular sieves comprising silicalite in a phosphorus modified alumina matrix and their method of manufacture.

2. Description of the Prior Art

It is well known in the separation art that certain crystalline aluminosilicates can be used to separate hydrocarbon types from mixtures thereof. As a few examples, a separation process disclosed in U.S. Pat. Nos. 2,985,589 and 3,201,491 uses a type A zeolite to separate normal paraffins from branched chain paraffins, and processes described in U.S. Pat. Nos. 3,265,750 and 3,510,423 use type X or type Y zeolites to separate olefinic hydrocarbons from paraffinic hydrocarbons. In addition to their use in processes for separating hydrocarbon types, X and Y zeolites have been employed in processes to separate individual hydrocarbon isomers. As a few examples, absorbents comprising X and Y zeolites are used in the process described in U.S. Pat. No. 3,114,782 to separate alkyl-trisubstituted benzene isomers; in the process described in U.S. Pat. No. 3,864,416 to separate alkyl-tetrasubstituted monocyclic aromatic isomers; and in the process described in U.S. Pat. No. 3,668,267 to separate specific alkyl-substituted naphthalenes. Because of the commercial importance of para-xylene, perhaps the more well known and extensively used hydrocarbon isomer separation processes are those for separating para-xylene from a mixture of $C_8$ aromatics. In processes described in U.S. Pat. Nos. 3,558,730; 3,558,732; 3,626,020; 3,663,638; and 3,734,974, for example, molecular sieves comprising particular zeolites are used to separate para-xylene from feed mixtures comprising paraxylene and at least one other xylene isomer by selectively adsorbing paraxylene over the other xylene isomers.

In contrast, this invention relates to phosphorus modified alumina molecular sieves utilized for the separation of non-hydrocarbons and more specifically to the separation of fatty acids. Substantial uses of fatty acids are in the plasticizer and surface active agent fields. Derivatives of fatty acids are of value in compounding lubricating oil, as a lubricant for the textile and molding trade, in special lacquers, as a water-proofing agent, in the cosmetic and pharmaceutical fields, and in biodegradable detergents.

It is known from U.S. Pat. No. 4,048,205 to use type X and type Y zeolites for the separation of unsaturated from saturated esters of fatty acids. The type X and type Y zeolites, however, will not separate rosin acids found in tall oil from the fatty acids, apparently because the pore size of those zeolites (over 7 Angstroms) are large enough to accommodate and retain the relatively large diameter molecules of rosin acids as well as the smaller diameter molecules of fatty acids. Type A zeolite, on the other hand, has a pore size (about 5 Angstroms) which is unable to accommodate either of the above type acid and is, therefore unable to separate them. An additional problem when a zeolite is used to separate free acids is the reactivity between the zeolite and free acids.

It is also known that silicalite, a non-zeolitic hydrophobic crystalline silica molecular sieve, exhibits molecular sieve selectivity for a fatty acid with respect to a rosin acid, particularly when used with a specific displacement fluid. Silicalite. however, a fine powder, must be bound in some manner to enable its practical use as a molecular sieve. Most binders heretofore attempted are not suitable for use in separating the components of tall oil because of the binder's reactivity or interference with the separation. One binder that has been found effective is amorphous silica, which. however, must be treated in some manner to eliminate hydroxyl groups on the molecular sieve particles.

We have discovered a new binder which when incorporated with the silicalite provides a new molecular sieve uniquely suitable for the separation of the components of tall oil.

SUMMARY OF THE INVENTION

In brief summary, the invention is, in one embodiment, a molecular sieve comprising silicalite in a phosphorus modified alumina matrix. The precursor of the molecular sieve comprises silicalite powder dispersed in an alumina hydrosol commingled with a phosphorus containing compound, the phosphorus to aluminum molar ratio in the hydrosol being from 1:1 to 1:100.

In another embodiment, our invention is a method of manufacturing a molecular sieve comprising silicalite in a phosphorus modified alumina matrix. which method comprises: (a) mixing silicalite powder and a phosphorus containing compound into an alumina hydrosel, the phosphorus to aluminum molar ratio being from 1:1 to 1:1 and (b) obtaining particles of the molecular sieve from the admixture of step (a).

Other embodiments of our invention encompass details about feed mixtures, molecular sieves, displacement fluids and operating conditions, all of which are hereinafter disclosed in the following discussion of each of the facets of the present invention.

DESCRIPTION OF THE INVENTION

Figure 1:
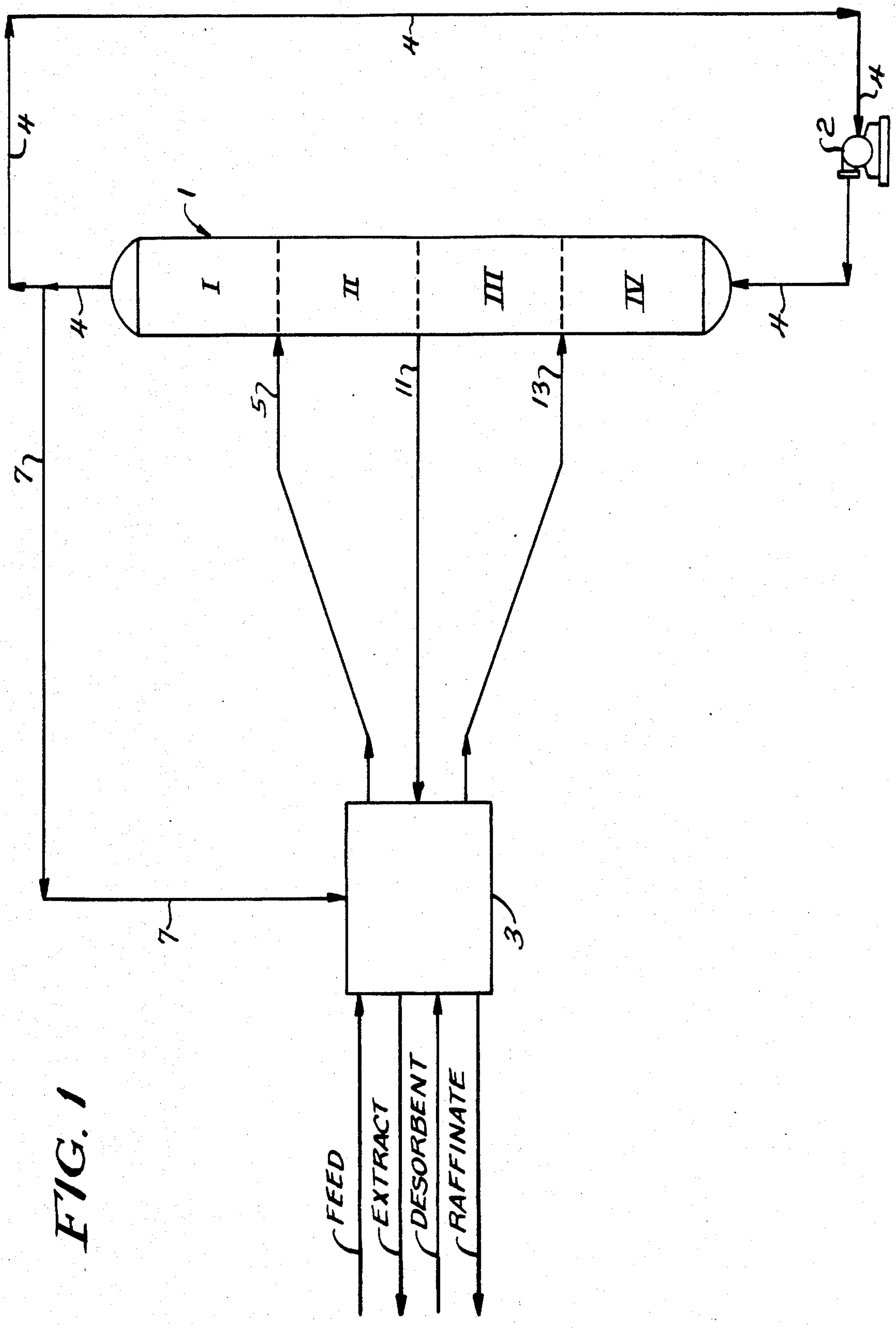
FIG. 1 represents, in schematic form, the embodiment of the present invention incorporating a simulated moving bed, hereinafter described, including adsorption column 1, manifold system 3 and various interconnecting lines.

At the outset the definitions of various terms used throughout the specification will be useful in making clear the operation, objects and advantages of this process.

A "feed mixture" is a mixture containing one or more extract components and one or more raffinate components to be separated by this process. The term "feed stream" indicates a stream of a feed mixture which passes to the molecular sieve used in the process.

An "extract component" is a compound or type of compound that is retained by the molecular sieve while a "raffinate component" is a compound or type of compound that is not retained. In this process a fatty acid is an extract component and a rosin acid is a raffinate component. The term "displacement fluid" shall mean generally a fluid capable of displacing an extract component. The term "displacement fluid stream" or "displacement fluid input stream" indicates the stream through which displacement fluid material passes to the molecular sieve. The term "raffinate stream" or "raffinate output stream" means a stream through which a raffinate component is removed from the molecular sieve. The composition of the raffinate stream can vary from essentially a 100% displacement fluid to essentially 100% raffinate components. The term "extract stream" or "extract output stream" shall mean a stream through which an extract material which has been displaced by a displacement fluid is removed from the molecular sieve. The composition of the extract stream, likewise, can vary from essentially 100% displacement fluid to essentially 100% extract components. At least a portion of the extract stream and preferably at least a portion of the raffinate stream from the separation process are passed to separation means, typically fractionators, where at least a portion of displacement fluid and diluent is separated to produce an extract product and a raffinate product. The terms "extract product" and "raffinate product" mean products produced by the process containing, respectively, an extract component and a raffinate component in higher concentrations than those found in the extract stream and the raffinate stream. Although it is possible by the process of this invention to produce a high purity, fatty acid product or a rosin acid product (or both) at high recoveries, it will be appreciated that an extract component is never completely retained by the molecular sieve, nor is a raffinate component completely not retained by the molecular sieve. Therefore, varying amounts of a raffinate component can appear in the extract stream and, likewise, varying amounts of an extract component can appear in the raffinate stream. The extract and raffinate streams then are further distinguished from each other and from the feed mixture by the ratio of the concentrations of an extract component and a raffinate component appearing in the particular stream. More specifically, the ratio of the concentration of a fatty acid to that of non-retained rosin acid will be lowest in the raffinate stream, next highest in the feed mixture, and the highest in the extract stream. Likewise, the ratio of the concentration of a rosin acid to that of the fatty acid will be highest in the raffinate stream, next highest in the feed mixture, and the lowest in the extract stream.

The term "selective pore volume" of the molecular sieve is defined as the volume of the molecular sieve which selectively retains an extract component from the feed mixture. The term "nonselective void volume" of the molecular sieve is the volume of the molecular sieve which does not selectively retain an extract component from the feed mixture. This latter volume includes the cavities of the molecular sieve which admit raffinate components and the interstitial void spaces between molecular sieve particles. The selective pore volume and the non-selective void volume are generally expressed in volumetric quantities and are of importance in determining the proper flow rates of fluid required to be passed into an operational zone for efficient operations to take place for a given quantity of molecular sieve.

When molecular sieve "passes" into an operational zone (hereinafter defined and described) employed in one embodiment of this process, its non-selective void volume toqether with its selective pore volume carries fluid into that zone. The non-selective void volume is utilized in determininq the amount of fluid which should pass into the same zone in a countercurrent direction to the molecular sieve to displace the fluid present in the non-selective void volume. If the fluid flow rate passing into a zone is smaller than the non-selective void volume rate of molecular sieve material passing into that zone, there is a net entrainment of liquid into the zone by the molecular sieve. Since this net entrainment is a fluid present in non-selective void volume of the molecular sieve, it in most instances comprises non-retained feed components. The selective pore volume of a molecular sieve can in certain instances adsorb portions of raffinate material from the fluid surrounding the molecular sieve since in certain instances there is competition between extract material and raffinate material for adsorptive sites within the selective pore volume. If a large quantity of raffinate material with respect to extract material surrounds the molecular sieve, raffinate material can be competitive enough to be retained by the molecular sieve.

Before considering feed mixtures which can be charged to the process of this invention, brief reference is first made to the terminology. The fatty acids are a large group of aliphatic monocarboxylic acids, many of which occur as glycerides (esters of glycerol) in natural fats and oils. Althounh the term "fatty acids" has been restricted by some to the saturated acids of the acetic acid series, both normal and branched chain, it is now generally used, and is so used herein, to include also related unsaturated acids, certain substituted acids, and even aliphatic acids containing alicyclic substitutents. The naturally occurrinq fatty acids with a few exceptions are higher straight chain unsubstituted acids containing an even number of carbon atoms. The unsaturated fatty acids can be divided, on the basis of the number of double bonds in the hydrocarbon chain, into monoethanoid, diethanoid, triethanoid, etc. (or monoethylenic, etc.). Thus the term "unsaturated fatty acid" is a generic term for a fatty acid having at least one double bond, and the term "polyethanoid fatty acid" means a fatty acid having more than one double bond per molecule. Fatty acids are typically prepared from glyceride fats or oils by one of several "splitting" or hydrolytic processes. In all cases, the hydrolysis reaction may be summarized as the reaction of a fat or oil with water to yield fatty acids plus glycerol. In modern fatty acid plants, this process is carried out by continuous high pressure, high temperature hydrolysis of the fat. Starting materials commonly used for the production of fatty acids include coconut oil, palm oil, inedible animal fats, and the commonly used vegetable oils, soybean oil, cottonseeed oil and corn oil.

The source of fatty acids with which the present invention is primarily concerned is tall oil, a by-product of the wood pulp industry, usually recovered from pine wood "black liquor" of the sulfate or Kraft paper process. Tall oil contains about 50–60% fatty acids and about 34–40% rosin acids. The fatty acids include oleic, linoleic, palmitic and stearic acids. Rosin acids, such as abietic acid, are monocarboxylic acids having a molecular structure comprising carbon, hydrogen and oxygen with three fused six-membered carbon rings, which accounts for the much larger molecular diameter of rosin acids as compared to fatty acids. Feed mixtures which can be charged to this process may contain, in addition to the components of tall oil, a diluent material that is not retained by the molecular sieve and which is preferably separable from the extract and raffinate output streams by fractional distillation. When a diluent is employed, the concentration of diluent in the mixture of diluent and acids will preferably be from a few vol. % up to about 75 vol. % with the remainder being fatty acids and rosin acids.

Displacement fluids used in various prior art adsorptive and molecular sieve separation processes vary depending upon such factors as the type of operation employed. In separation processes which are generally operated continuously at substantially constant pressures and temperatures to ensure liquid phase, and which employ a molecular sieve, the displacement material must be judiciously selected to satisfy many criteria. First, the displacement material should displace an extract component from the molecular sieve with reasonable mass flow rates but yet allow access of an extract component into the molecular sieve so as not to unduly prevent an extract component from displacing the displacement material in a following separation cycle. Displacement fluids should additionally be substances which are easily separable from the feed mixture that is passed into the process. Both the raffinate stream and the extract stream are removed from the molecular sieve in admixture with displacement fluid and without a method of separating at least a portion of the displacement fluid, the purity of the extract product and the raffinate product would not be very high nor would the displacement fluid be available for reuse in the process. It is therefore contemplated that any displacement fluid material used in this process will preferably have a substantially different average boiling point than that of the feed mixture to allow separation of at least a portion of displacement fluid from feed components in the extract and raffinate streams by simple fractional distillation, thereby permittinq reuse of displacement fluid in the process. The term "substantially different" as used herein shall mean that the difference between the average boiling points between the displacement fluid and the feed mixture shall be at least about 5° C. The boilinq range of the displacement fluid may be higher or lower than that of the feed mixture. Finally, displacement fluids should also be materials which are readily available and therefore reasonable in cost. In the preferred isothermal, isobaric, liquid-phase operation of the process of our invention, we have found displacement fluids comprising organic acids to be effective with short chain organic acids having from 2 to 5 carbon atoms preferred, particularly when, as discussed hereinafter, a diluent is used.

It has been observed that even silicalite may be ineffective in separating fatty and rosin acids upon reuse of the molecular sieve bed for separation following the displacement step. When displacement fluid is present in the bed, selective retention of the fatty acid may not occur. It is hypothesized that the displacement fluid, particularly an organic acid which is the most effective displacement fluid, takes part in or even catalyzes hydrogen-bonded dimerization reactions in which there is an alignment between the molecules of the fatty and rosin acids and, perhaps, the molecules of the displacement fluid. These dimerization reactions may be represented by the formulas:

$$FA+FA \rightleftharpoons (FAFA)$$

$$RA+RA \rightleftharpoons (RARA)$$

$$FA+RA \rightleftharpoons (FARA)$$

where FA and RA stand for fatty acids and rosin acids, respectively. The organic acid displacement fluid molecules should probably also be considered reactants and product constituents in the above equations. The dimers would preclude separation of the fatty and rosin acids by blocking access of the former into the pores of the molecular sieve. This hindrance to separation caused by the presence of dimers does not appear to be a significant problem in the aforementioned process for separation of esters of fatty and rosin acids.

It has been discovered that the above dimerization reactions may be minimized if the displacement fluid comprises the organic acid in solution with a properly selected diluent. There are diluents which exhibit the property of minimizing dimerization. The measure of this property was found to be the polarity index of the liquid. Polarity index is as described in the article, "Classification of the Solvent Properties of Common Liquids"; Snyder, L., *J. Chromatography,* 92, 223 (1974), incorporated herein by reference. The minimum polarity index of the displacement fluid diluent preferred for the process of the present invention, is 3.5, particularly when the displacement fluid is a short chain organic acid as discussed above. The diluent should comprise from about 50 to about 95 liquid volume percent of the displacement fluid. Polarity indices for certain selected solvents are as follows:

| SOLVENT | POLARITY INDEX |
|---|---|
| Isooctane | −0.4 |
| n-Hexane | 0.0 |
| Toluene | 2.3 |
| p-Xylene | 2.4 |
| Benzene | 3.0 |
| Methylethylketone | 4.5 |
| Acetone | 5.4 |

The molecular sieve to be used in the process of this invention comprises silicalite. As previously mentioned, silicalite is a hydrophobic crystalline silica molecular sieve. Silicalite is disclosed and claimed in U.S. Pat. Nos. 4,061,724 and 4,104,294 to Grose et al, incorporated herein by reference. As previously mentioned, silicalite is a hydrophobic crystalline silica molecular sieve. Due to its aluminum-free structure, silicalite does not show ion-exchange behavior, and is hydrophobic and organophilic. Silicalite thus comprises a molecular sieve, but not a zeolite. Silicalite is uniquely suitable for the separation process of this invention for the presumed reason that its pores are of a size and shape that enable the silicalite to function as a molecular sieve, i.e., accept the molecules of fatty acids into its channels or internal structure, while rejecting the molecules of rosin acids. A detailed discussion of silicalite may be found in the article "Silicalite, A New Hydrophobic Crystalline Silica Molecular Sieve"; *Nature,* Vol. 271, 9 February 1978, incorporated herein by reference.

It is essential to the present invention that the silicalite be bound by phosphorus modified alumina matrix.

The invention requires the mixing of the silicalite into an alumina hydrosol commingled with a phosphorus containing compound and obtaining particles of the molecular sieve from the mixture. Hydrosols are such as are prepared by the general method whereby an acid salt of an appropriate metal is hydrolyzed in aqueous solution and the solution treated at conditions to reduce the acid compound concentration thereof, as by neutralization. The resulting olation reaction yields inorganic polyners of colloidal dimension dispersed and suspended in the remaining liquid. An alumina hydrosol can be prepared by the hydrolysis of an acid salt of aluminum, such as aluminum chloride, in aqueous solution, and treatment of the solution at conditions to reduce the resulting chloride compound concentration thereof, as by neutralization, to achieve an aluminum/chloride compound weight ratio from about 0.70:1 to about 1.5:1.

In accordance with the method of the present invention a phosphorus-containing compound is added to the above-described alumina hydrosol. Representative phosphorus-containing compounds which may be utilized in the present invention include $H_3PO_4$, $H_3PO_2$, $H_3PO_3$, $(NH_4)H_2PO_4$, $(NH_4)_2HPO_4$, $K_3PO_4$, $K_2HPO_4$, $KH_2PO_4$, $Na_3PO_4$, $Na_2HPO_4$, $NaH_2PO_4$, $PX_3$, $RPX_2$, $R_2PX$, $R_3P$, $X_3PO$, $(XO)_3PO$, $(XO)_3P$, $R_3PO$, $R_3PS$, $RPO_2$, $RPS_2$, $RP(O)(OX)_2$, $RP(S)(SX)_2R_2P(O)OX$, $R_2P(S)SX$, $RP(OX)_2$, $RP(SX)_2$, $ROP(OX)_2$, $RSP(SX)_2$, $(RS)_2PSP(SR)_2$, and $(RO)_2POP(OR)_2$, where R is an alkyl or aryl, such as a phenyl radical, and X is hydrooen, R, or halide. These compounds include primary, $RPH_2$, secondary, $R_2PH$ and tertiary, $R_3P$, phosphines such as butyl phosphine, the tertiary phosphine oxides $R_3PO$, such as tributylphosphine oxide, the tertiary phosphine sulfides, $R_3PS$, the primary, $RP(O)(OX)_2$, and secondary, $R_2P(O)OX$, phosphonic acids such as benzene phosphonic acid, the corresponding sulfur derivatives such as $RP(S)(SX)_2$ and $R_2P(S)SX$, the esters of the phosphonic acids such as dialkyl phosphonate, $(RO)_2P(O)H$, dialkyl alkyl phosphonates, $(RO)_2P(O)R$, and alkyl dialkyl-phosphinates $(RO)P(O)R_2$; phosphinous acids, $R_2POX$, such as diethylphosphinous acid, primary, $(RO)P(OX)_2$, secondary, $(RO)_2POX$, and tertiary. $(RO)_3P$, phosphites, and esters thereof such as the monopropyl ester, alkyl dialkylphosphinites, $(RO)PR_2$ and dialkyl alkylphosphinite, $(RO)_2PR$, esters. Corresponding sulfur derivates may also be employed including $(RS)_2P(S)H$, $(RS)_2P(S)R$, $(RS)P(S)$ $R_2R_2PSX$, $(RS)P(SX)_2$, $(RS)_2PSX$, $(RS)_3P$, $(RS)PR_2$ and $(RS)_2PR$. Examples of phosphite esters include trimethylphosphite, triethylphosphite, diisopropylphosphite, butylphosphite, and pyrophosphites such as tetraethylpyrophosphite. The alkyl groups in the mentioned compounds preferably contain one to four carbon atoms.

Other suitable phosphorus-containing compounds include ammonium hydrogen phosphate, the phosphorus halides such as phosphorus trichloride, bromide, and iodide, alkyl phosphorodichloridites, $(RO)PCl_2$, dialkyl phosphorochloridites, $(RO)_2PCl$, dialkylphosphinochloroidites, $R_2PCl$, alkyl alkylphosphonochloridates, $(RO)(R)P(O)Cl$, dialkyl phosphinochloridates, $R_2P(O)Cl$ and $RP(O)Cl_2$. Applicable corresponding sulfur derivates include $(RS)PCl_2$, $(RS)_2PCl$, $(RS)(R)P(S)Cl$ and $R_2P(S)Cl$.

The present invention requires a phosphorus to aluminum molar ratio in the molecular sieve (and hydrosol) of from 1:1 to 1:100. A 1:1 molar ratio of aluminum to phosphorus in the mol corresponds to a final calcined particle composition containing (on a silicalite free basis) 24.74 wt. % phosphorus and 20.5 wt. % aluminum, while a 1:100 molar ratio corresponds to a final composition of 0.6 wt. % phosphorus and 52.0 wt. % aluminum. .

-The aluminum chloride hydrosol is typically prepared by digesting aluminum in aqueous hydrochloric acid and/or aluminum chloride solution at about reflux temperature, usually from about 80° to about 105° C., and reducing the chloride corpound concentration of the resulting aluminum chloride solution by the device of maintaining an excess of the aluminum reactant in the reaction mixture of a neutralizing agent. Preferably, the alumina hydrosol is an aluminum chloride hydrosol variously referred to as an aluminum oxychloride hydrosol, aluminum hydroxychloride hydrosol, and the like such as is formed when utilizing aluminum metal as a neutralizing agent in conjunction with an aqueous aluminum chloride solution. In any case, the aluminum chloride hydrosol is prepared to contain aluminum in from about a 0.70:1 to about 1.5:1 weight ratio with the chloride compound content thereof.

In accordance with the method of the present invention silicalite containing phosphorus modified alumina molecular sieve is prepared by a method which comprises commingling the alumina hydrosol with a silicalite and a phosphorus-containing compound, the phosphorus to aluminum molar ratio in the admixture being from 1:1 to 1:100, and subsequently obtaining particles of the molecular sieve therefrom.

In one embodiment the molecular sieve ray be obtained by spray drying the above-described silicalite and phosphorus containinp alumina hydrosol or commingling the subject hydrosol with a gelling agent and then spray drying. Spray-drying may typically be carried out at a temperature of 800° to 1400° F. at about atmospheric pressure.

In another embodiment in accordance with the oil-drop method, the silicalite and phosphorus-containing hydrosol is dispersed as droplets in a suspending medium, typically a hot oil whereby gelation occurs with the formation of spherical gel particles. The setting aqent is typically a weak base which when mixed with the hydrosol will cause the mixture to set to a gel within a reasonable time. In this type of operation, the hydrosol is typically set by utilizing ammonia as a neutralizing or setting agent. Usually, the ammonia is furnished by an ammonia precursor which is added to the hydrosol. The precursor is suitably hexamethylene tetramine, or urea, or mixtures thereof, although other weakly basic materials which are substantially stable at normal temperatures but decompose to form ammonia with increasing temperature, may be suitably employed. It has been found that equal volumes of the hydrosol and of the hexamethylene tetramine solution are satisfactory but it is understood that this may vary somewhat. The use of a smaller amount of hexamethylene tetramine solution tends to result in soft spheres while on the other hand, the use of larger volumes of base solution results in spheres which tend to crack easily. Only a fraction of the ammonia precursor is hydrolyzed or decomposed in the relatively short period during which initial gelation occurs. During the subsequent aging process, the residual ammonia precursor retained in the spheroidal particles continues to hydrolyze and effect further polymerization of the alumina hydrogel whereby desirable pore characteristics are established. Aging of the hydrogel is suitably accomplished over a period of from about 1 to about 24 hours, preferably in the oil suspending medium, at a temperature of from about 60° to about 150° C. or more, and at a pressure to raintain the water content of the hydroqel spheres in a substantially liquid phase. The aging of the hydrogel can also be carried out in aqueous $NH_3$ solution at about 95° C. for a period up to about 6 hours. Following the aging step the hydroqel spheres may be washed with water containing ammonia.

After the hydrogel particles are aged a drying step is effected. Drying of the particles is suitably effected at a temperature of from 38° to about 205° C. Subsequent to the dryinq step a calcination step is effected at a temperature of from about 425° to about 760° C. for 2 to 12 hours or more which may be carried out in the presence of steam.

The molecular sieve may be employed in the form of a dense compact fixed bed which is alternatively contacted with the feed mixture and displacement fluid. In the simplest embodirent of the invention, the molecular sieve is employed in the form of a single static bed in which case the process is only semi-continuous. In another embodiment, a set of two or more static beds may be employed in fixed bed contacting with appropriate valving so that the feed mixture is passed through one or more molecular sieve beds, while the displacement fluid can be passed through one or more of the other beds in the set. The flow of feed mixture and displacement fluid may be either up or down through the molecular sieve. Any of the conventional apparatus employed in static bed fluid-solid contacting may be used.

Countercurrent moving bed or simulated moving bed ccuntercurrent flow systems, however, have a much greater separation efficiency than fixed bed systems and are therefore preferred. In the moving bed or simulated moving bed processes, the retention and displacement operations are continuously taking place which allows both continuous production of an extract and a raffinate stream and the continual use of feed and displacement fluid streams. One preferred embodiment of this process utilizes what is known in the art as the simulated moving bed countercurrent flow system. The operating principles and sequence of such a flow system are described in U.S. Pat. No. 2,985,589 incorporated herein by referenee. In such a system, it is the progressive movement of multiple liquid access points down a molecular sieve chamber that simulates the upward movement of molecular sieve contained in the chamber. Only five of the access lines are active at any one time: the feed input stream, displacement fluid inlet stream, raffinate outlet stream, and extract outlet stream access lines. Coincident with this simulated upward movement of the solid molecular sieve is the movenent of the liquid occupying the void volume of the packed bed of molecular sieve. So that countercurrent contact is maintained, a liquid flow down the molecular sieve chamber may be provided by a pump. As an active liquid access point moves through a cycle, that is, from the top of the chamber to the bottom, the chanber circulation pump moves through different zones which require different flow rates. A programmed flow controller may be provided to set and regulate these flow rates.

The active liquid access points effectively divided the molecular sieve chamber into separate zones, each of which has a different function. In this embodiment of the process, it is generally necessary that three separate operational zones be present in order for the process to take place although in some instances an optional fourth zone may be used. There is a net positive fluid flow through all portions of the column in the same direction, although the composition and rate of the fluid will, of course, vary from point to point. With reference to FIG. 1, zones I, II, III and IV are shown as well as manifold system 3 pump 2, which maintains the net positive fluid flow, and line 4 associated with pump 2. Also shown and identified are the inlet and outlet lines to the process which enter or leave via manifold system 3.

The retention zone, zone I, is defined as the molecular sieve located between the feed inlet stream 5 and the raffinate outlet stream 7. In this zone, the feedstock contacts the molecular sieve, an extract component is retained, and a raffinate stream is withdrawn. Since the general flow through zone I is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in zone I is the purification zone, zone II. The purification zone is defined as the molecular sieve between the extract outlet stream and the feed inlet stream 5. The basic operations taking place in zone II are the displacement from the non-selective void volume of the molecular sieve by a circulating stream of any raffinate material carried into zone II by the shifting of molecular sieve into this zone and the displacement of any raffinate material retained within the selective pore volume of the molecular sieve or retained on the surfaces of the molecular sieve particles. Purification is achieved by passing a portion of extract stream material leaving zone III into zone II at zone II's upstream boundary, the extract outlet stream, to effect the displacement of raffinate material. The flow of material in zone II is in a downstream direction from the extract outlet stream to the feed inlet stream.

Immediately upstream of zone 11 with respect to the fluid flowing in zone II is the displacement zone, zone III. The displacement zone is defined as the molecular sieve between the displacement fluid inlet 13 and the extract outlet stream 11. The function of the displacement zone is to allow a displacement fluid which passes into this zone to displace the extract component which was retained in the molecular sieve during a previous contact with feed in zone I in a prior cycle of operation. The flow of fluid in zone 111 is essentially in the same direction as that of zones I and II.

In some instances an optional buffer zone, zone IV, may be utilized. This zone, defined as the molecular sieve between the raffinate outlet stream 7 and the displacement fluid inlet stream 13, if used, is located immediately upstream with respect to the fluid flow to zone III. Zone IV would be utilized to conserve the amount of displacement fluid utilized in the displacement step since a portion of the raffinate stream which is removed from zone I can be passed into zone IV to displace displacement fluid present in that zone out of that zone into the displacement fluid zone. Zone IV will contain enough molecular sieve so that raffinate material present in the raffinate stream passing out of zone I and into zone IV can be prevented from passing into zone III thereby contaminating extract stream removed from zone III. In the instances in which the fourth operational zone is not utilized, the raffinate stream which would have passed from zone I to zone IV must be carefully monitored in order that the flow directly from zone I to zone III can be stopped when there is an appreciable quantity of raffinate material present in the raffinate stream passing from zone I to zone III so that the extract outlet stream is not contaminated.

A cyclic advancement of the input and output streams through the fixed bed of molecular sieve can be accomplished by utilizing a manifold system 3 in which the valves in the manifold are operated in a sequential manner to effect the shifting of the input and output streams thereby allowing a flow of fluid with respect to solid molecular sieve in a countercurrent manner. Another mode of operation which can effect the countercurrent flow of solid molecular sieve with respect to fluid involves the use of rotating disc valve in which the input and output streams are connected to the valve and the lines through which feed input, extract output, displacement fluid input and raffinate output streams pass are advanced in the same direction through the molecular sieve bed. Both the manifold arrangement and disc valve are known in the art. Specifically, rotary disc valves which can be utilized in this operation can be found in U.S. Pat. Nos. 3,040,777 and 3,422,848. Both of the aforementioned patents disclose a rotary type connection valve in which the suitable advancement of the various input and output streams from fixed sources can be achieved without difficulty.

In many instances, one operational zone will contain a much larger quantity of molecular sieve than some other operational zone. For instance, in some operations the buffer zone can contain a minor amount of molecular sieve as compared to the molecular sieve required for the retention and purification zones. It can also be seen that in instances in which displacement fluid is used which can easily displace extract material from the molecular sieve that a relatively small amount of molecular sieve will be needed in a displacement zone as compared to the molecular sieve needed in the buffer zone or retention zone or purification zone or all of them. Since it is not required that the molecular sieve be located in a single column, the use of multiple chambers or a series of columns is within the scope of the invention.

It is not necessary that all of the input or output streams be simultaneously used, and in fact, in many instances some of the streams can be shut off while others effect an input or output of material. The apparatus which can be utilized to effect the process of this invention can also contain a series of individual beds connected by connectinq conduits upon which are placed input or output taps to which the various input or output streams can be attached and alternately and periodically shifted to effect continuous operation. In some instances, the connecting conduits can be connected to transfer taps which during the normal operations do not function as a conduit through which material passes into or out of the process.

It is contemplated that at least a portion of the extract and raffinate output streams will pass into separate separation means wherein at least a portion of the displacement fluid can be separated from each stream to produce extract and raffinate products containing reduced concentrations of displacement fluid. The displacement fluid can be reused in the process. The separation means will typically be fractionation columns, the design and operation of which are well known to the separation art.

Reference can be made to D. B. Broughton U.S. Pat. No. 2,985,589, and to a paper entitled, "Continuous Adsorptive Processing—A New Separation Technique" by D. B. Broughton represented at the 34th Annual Meeting of the Society of Chemical Engineers at Tokyo, Japan on Apr. 2, 1969, both references incorporated herein by reference, for further explanation of the simulated moving bed countercurrent process flow scheme.

Although both liquid and vapor phase operations can be used in many adsorptive separation processes, liquid-phase operation is preferred for this process because of the lower temperature requirements and because of the higher yields of extract product that can be obtained with liquid-phase operation over those obtained with vapor-phase operation. Separation conditions will include a temperature range of from about 20° to about 200° C. with about 20° to about 100° C. being more preferred and a pressure sufficient to maintain liquid phase. Displacement conditions will include the same range of temperatures and pressures as used for separation conditions.

The size of the units which can utilize the process of this invention can vary anywhere from those of pilot-plant scale (see for example U.S. Pat. No. 3,706,812) to those of commercial scale and can range in flow rates from as little as a few cc an hour up to many thousands of gallons per hour.

A dynamic testing apparatus is employed to test various molecular sieves with a particular feed mixture and displacement fluid to measure the molecular sieve characteristics of retention capacity and exchange rate. The apparatus consists of a helical molecular sieve chamber of approximately 70 cc volume having inlet and outlet portions at opposite ends of the chamber. The chamber is contained within a temperature control means and, in addition, pressure control equipment is used to operate the chamber at a constant predetermined pressure. Quantitative and qualitative analytical equipment such as refractometers, polarimeters and chromatographs can be attached to the outlet line of the chamber and used to detect quantitatively or determine qualitatively one or more components in the effluent stream leaving the molecular sieve chamber. A pulse test, performed using this apparatus and the following general procedure, is used to determine data for various molecular sieve systems. The molecular sieve is filled to equilibrium with a particular displacement fluid material by passing the displacement fluid through the molecular sieve chamber. At a convenient time, a pulse of feed containing known concentrations of a tracer and of a particular extract component or of a raffinate component or both, all diluted in displacement fluid is injected for a duration of several minutes. Displacement fluid flow is resumed, and the tracer and the extract component or the raffinate component (or both) are eluted as in a liquid-solid chromatographic operation. The effluent can be analyzed on-stream or alternatively, effluent samples can be collected periodically and later analyzed separately by analytical equipment and traces of the envelopes or corresponding component peaks developed.

From information derived from the test, molecular sieve performance can be rated in terms of void volume, retention volume for an extract or a raffinate component, and the rate of displacement of an extract component from the molecular sieve. The retention volume of an extract or a raffinate component may be characterized by the distance between the center of the peak envelope of the tracer component or some other known reference point. It is expressed in terms of the volume in cubic centimeters of displacement fluid pumped during this time interval represented by the distance between the peak envelopes. The rate of exchange of an extract component with the displacement fluid can generally be characterized by the width of the peak envelopes at half intensity. The narrower the peak width, the faster the displacement rate. The displacement rate can also be characterized by the distance between the center of the tracer peak envelope and the disappearance of an extract component which has just been displaced. This distance is again the volume of displacement fluid pumped during this time interval.

The following non-limiting working examples are presented to illustrate the molecular sieve and its method of preparation of the present invention and is not intended to unduly restrict the scope of the claims attached hereto.

EXAMPLE I

The above described pulse test apparatus was used to obtain data for this example. The liquid temperature was 80° C. and the flow was down the column at the rate of 1.2 ml/min. The feed stream comprised 20 wt. % distilled tall oil, and 80 wt. % displacement fluid. The column was packed with 23 wt. % Ludox bound silicalite which had been prepared by a method including gelation by removal of water (drying) followed by treatment for removal of hydroxyl groups, which in this case was by heatinq in air at 1000° C. for 48 hours. The resulting molecular sieve was then ground and screened to 20–50 mesh. The displacement fluid used was 80 LV % methylethylketone and 20 LV % propionic acid.

Figure 2:
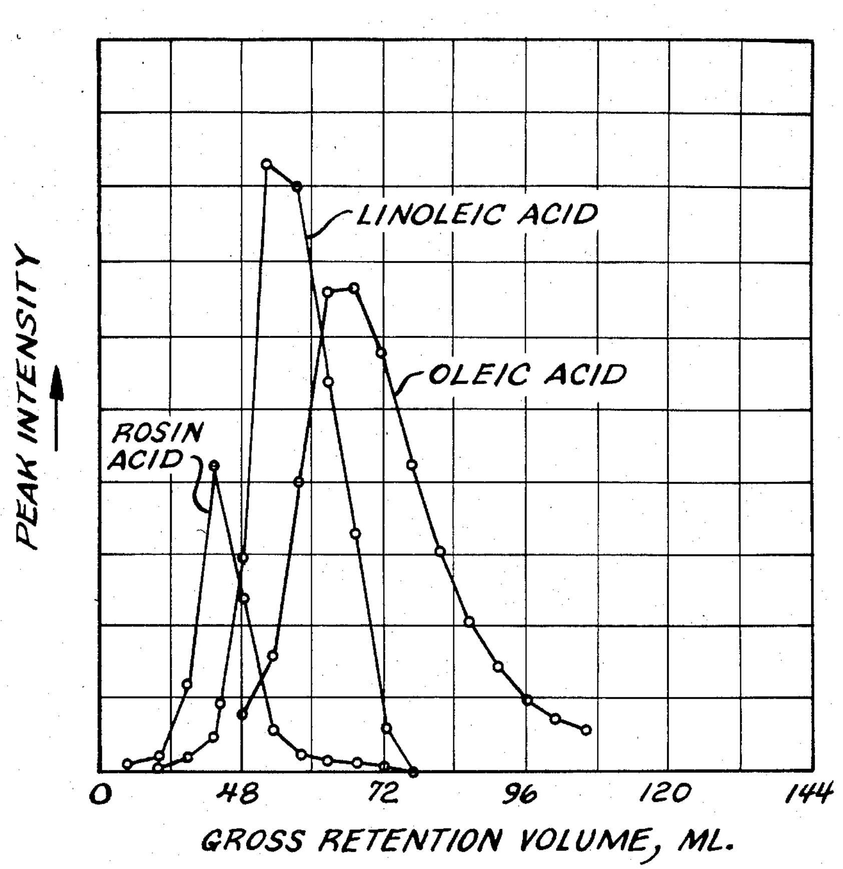
FIGS. 2 and 3 comprise graphical representations of data obtained for the following examples.

The results of this example, shown on the accompanying FIG. 2, indicate an acceptable separation.

EXAMPLE II

A test as described in Example I was repeated except that the molecular sieve used was an aluminum phosphate bound silicalite having the composition of (including a phosphorus to aluminum molar ratio of 1:1) and prepared in accordance with the present invention, and that the displacement fluid used was 2 LV % propionic acid and 98 LV % methylethylketone.

Figure 3:
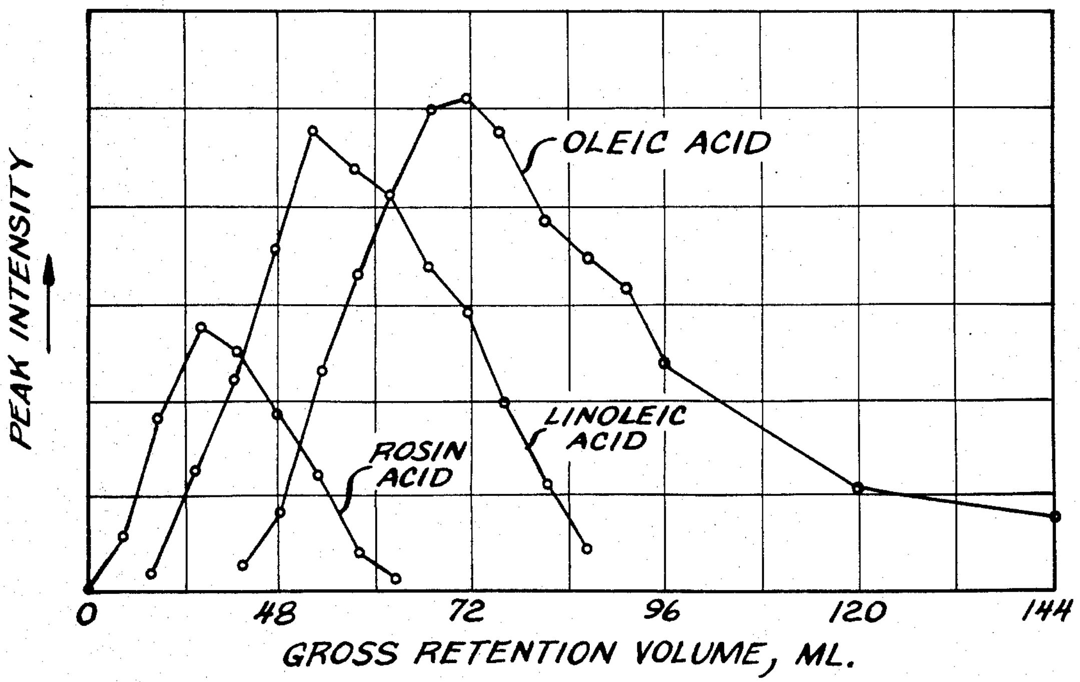

The results of this example are shown on the accompanying FIG. 3. The separation shown in FIG. 3 is as good as that of FIG. 2, perhaps better from the standpoint of less overlap (tailings) between the rosin acid and fatty acid curves.

The fact that a lower concentration of organic acid in the displacement fluid was used in this example as compared to Example I is not considered particularly significant other than in reflecting the discovery that such lower concentration is all that is required to effect efficient displacement.

To summarize the comparison of the results of Examples I and II, the separation achieved by the molecular sieve of the present invention is at least as good as that of the previously known silica bound silicalite without the requirement of treatment to remove hydroxyl groups. In addition to its highly desirable chemically inert properties, the molecular sieve of the present invention also exhibited exceptional physical strength and durability.

What is claimed is:

1. A molecular sieve adsorbent comprising silicalite in a phosphorus modified alumina matrix the precursor of said molecular sieve comprising silicalite powder dispersed in a phosphorus-containing alumina hydrosol, the phosphorus to aluminum molar ratio in said hydrosol being from 1:1 to 100:1.

2. The molecular sieve adsorbent of claim 1 wherein said molecular sieve comprises discrete particles.

3. A method of manufacturing a molecular sieve adsorbent comprising silicalite in a phosphorus modified alumina matrix, which method comprises (a) mixing silicalite powder and a phosphorus containing alumina hydrosol; the phosphorus to aluminum molar ratio being from 1:1 to 1:100; and (b) obtaining particles of said molecular sieve from the admixture of step (a).

4. The method of claim 3 wherein said particles are obtained by commingling said admixture with a gelling agent which is hydrolyzable at an elevated temperature, dispersing the hydrosol-gelling agent mixture as droplets in a suspending medium under conditions effective to transform said droplets into hydrogel particles, aging the hydrogel particles in the suspending medium, washing the hydrogel particles with water, drying and calcining the hydrogel particles to obtain spheroidal particles of said molecular sieve.

5. The method of claim 3 wherein the admixture is commingled with a gelling agent and spray dried at conditions effective to obtain particles of said molecular sieve.

6. The method of claim 5 wherein the gelling agent is hexamethylene-tetramine.

7. The method of claim 3 wherein the admixture is spray dried at conditions effective to obtain particles of said molecular sieve.

* * * * *